Patented Nov. 11, 1952

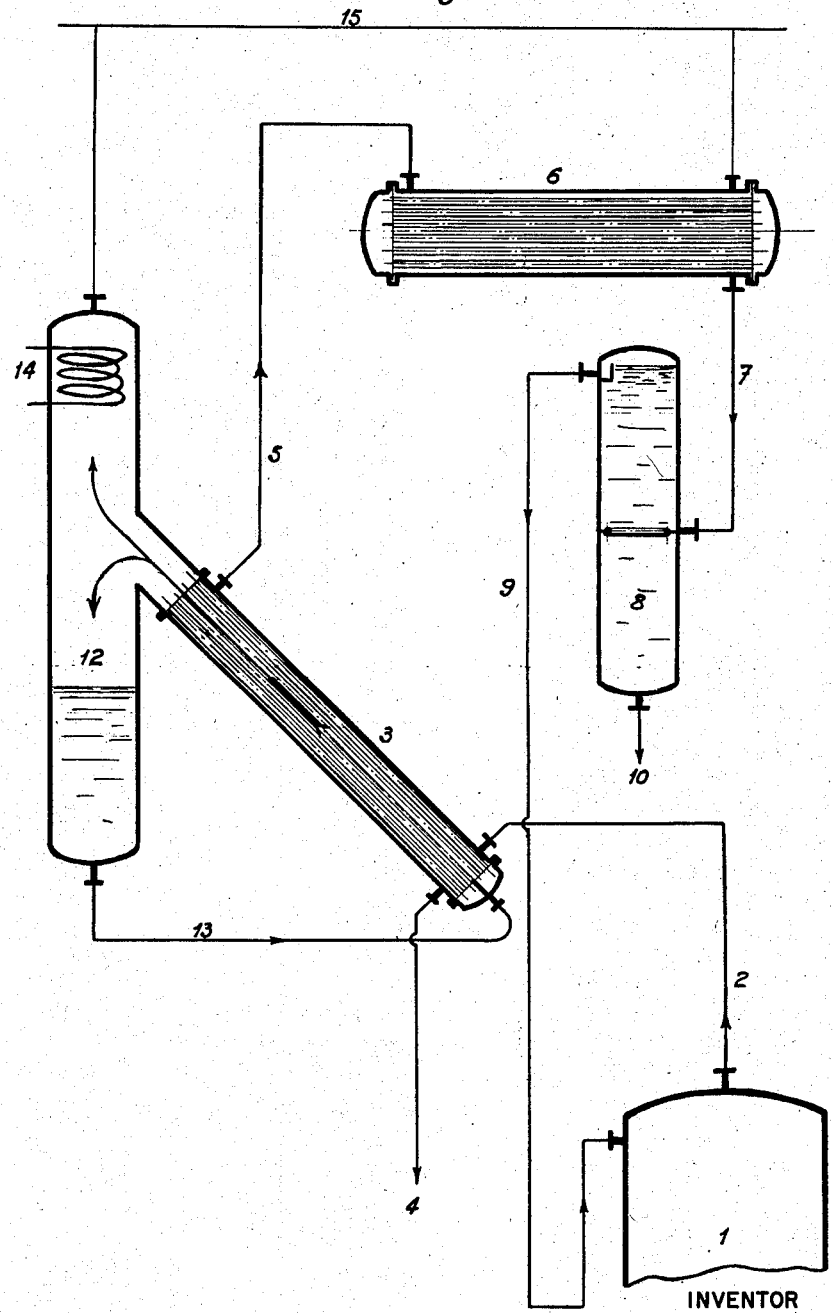

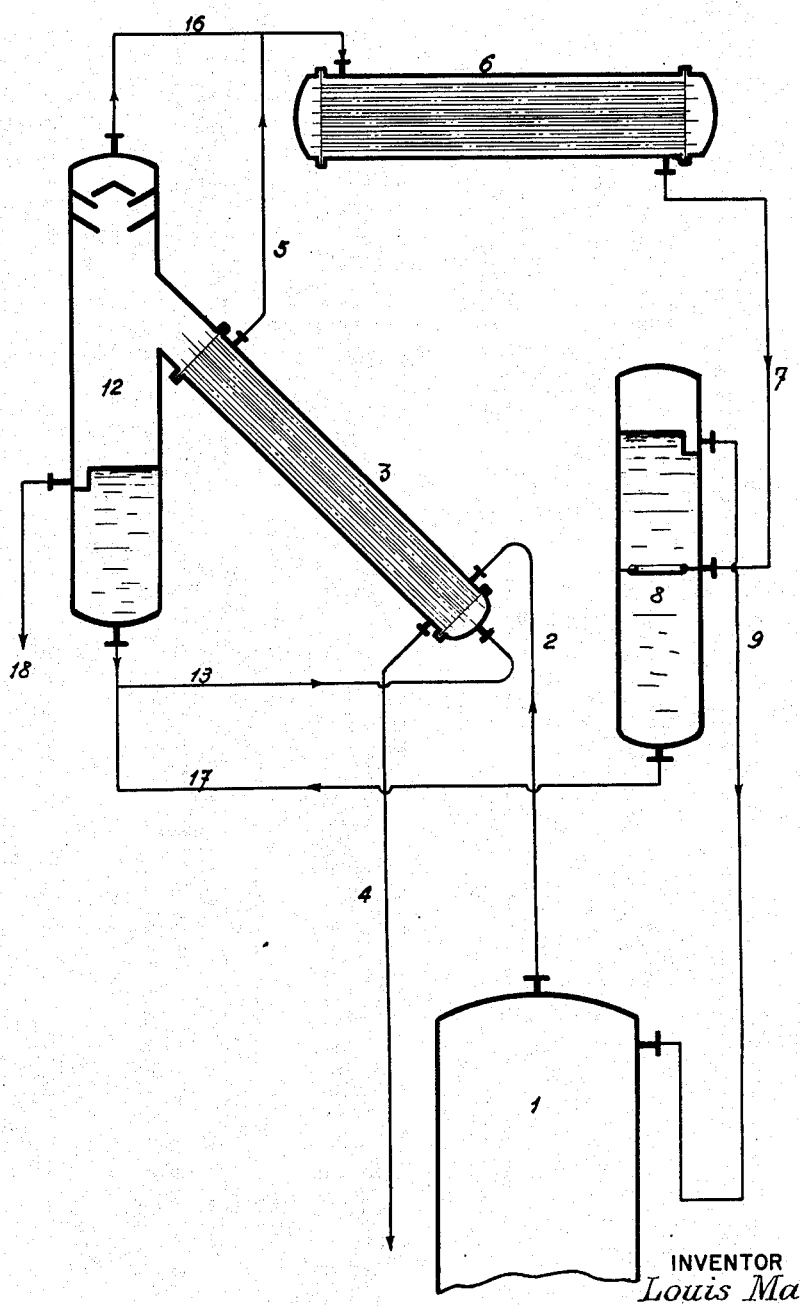

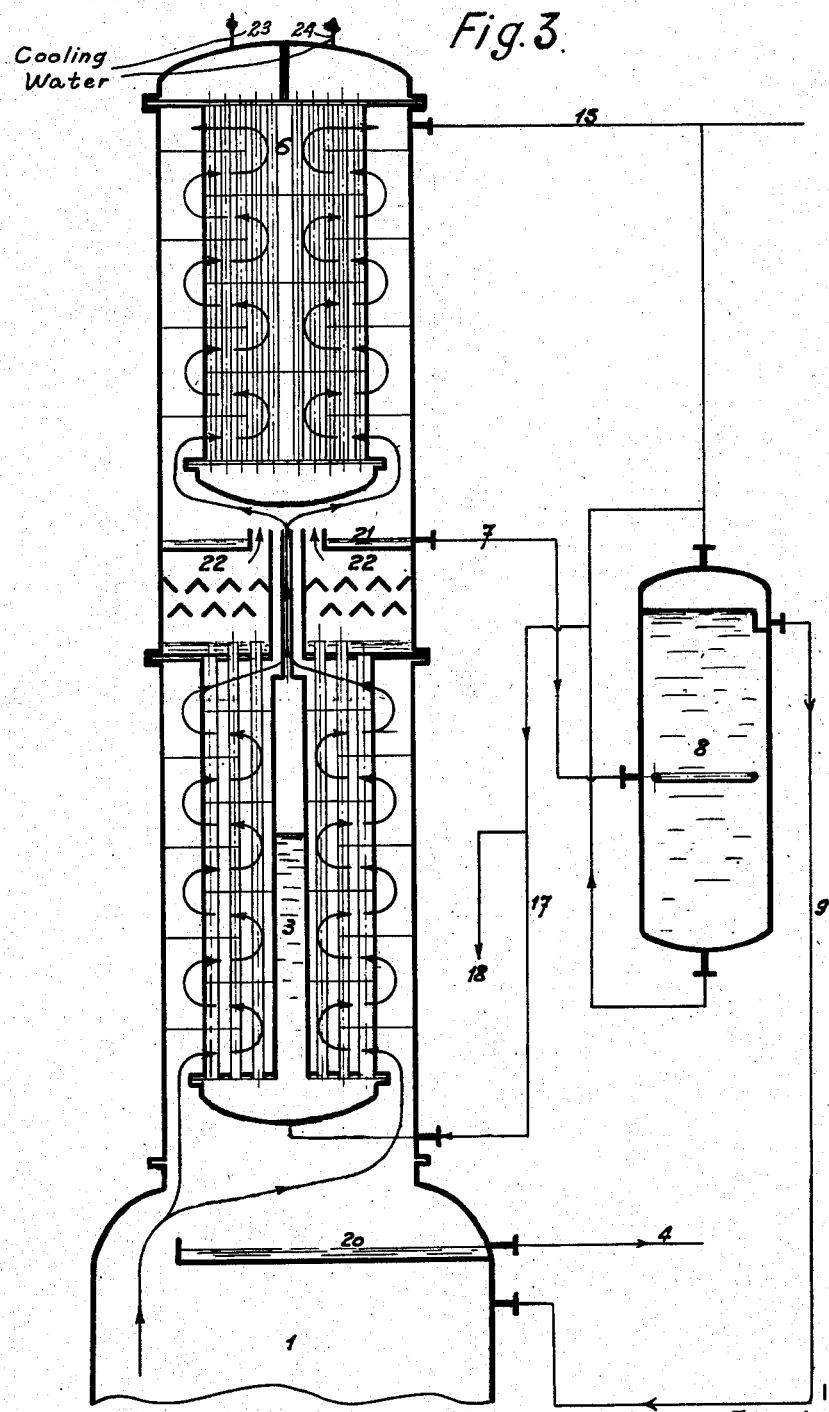

2,617,758

UNITED STATES PATENT OFFICE 2,617,758

PARTIAL CONDENSATION OF VAPORS

Louis Massiot, Paris, France, assignor to Compagnie Francaise de Raffinage (Societe Anonyme), Paris, France, a company of the French Republic Application December 15, 1945, Serial No. 635,386
In France July 13, 1944

Section 1, Public Law 690, August 8, 1946
Patent expires July 13, 1964

1 Claim. (Cl. 202—69)

My invention has for its object the separation of vapours of substances which are not normally miscible together in their liquid state. These mixtures of vapours are termed eutectic mixtures, the composition of the condensate being independent of the composition of the mixture of vapours at least as concerns the two substances extant in said condensate.

Such mixtures are found for instance in certain operations using solvents and also in the mineral oil industry for which steam is often used for carrying vapours along with it. The separation through mere decantation is not often possible, either by reason of its slowness or by reason of the formation of emulsions or of the fact that the substances are not perfectly insoluble one with reference to the other and that the layer of each substance contains, while they continue their decantation, noticeable proportions of the other substance.

According to the practice in use to this day, the condensation is generally executed in two stages. There is maintained in the primary condenser a temperature higher than that of the dew point of the eutectic mixture whereby only the excess of one component with reference to the composition of the eutectic is allowed to condense. In a secondary condenser, the vapours which have escaped the first condensation i. e. the eutectic mixture condense. This removes the necessity of making all the primary condensate pass through the decanting means; said primary condensate being a product not containing any fraction of the second component of the primary mixture if the operation has been properly executed, may be considered as the final product.

This manner of operating requires a very accurate adjustment of the temperatures and this adjustment, for a given plant and for a given temperature of the available cooling water, is executed by acting on the flow of this water. These results are satisfactory only if the apparatus is operative for a service which resembles very nearly that for which it has been designed. In case of any important variation in the rate of operation or of any change in the nature of the product treated, too great a reduction in the flow may, as a matter of fact, lead to a clogging when the speed is too low whereas too considerable an increase in the flow does not only require a great expenditure in water but risks giving the film of condensate temperatures which are locally inferior to the temperature sought for i. e. the temperature of condensation of the eutectic mixture, which leads to the possible presence of the second substance in a state of dissolution or occlusion inside the condensate.

In accordance with the present invention these drawbacks are removed by effecting the primary condensation under the action of the cooling produced by the vapourizing of a liquid the boiling temperature of which is equal to or very near the boiling temperature of the eutectic mixture. This leads thus to a self-regulation of the primary condensation and to a very easy and accurate adjustment in the case where the boiling points of the eutectic and of the excess component vapour are very little different.

The execution of the invention is illustrated in accompanying example with reference to accompanying drawings.

Figs. 1, 2 and 3 show three modifications of a plant for the execution of the invention.

In the example of Fig. 1, the vapours produced in the distillation tower 1 pass through the pipe 2 into the tubular bundle 3. The condensate passes out of said bundle through the pipe 4 and the eutectic vapours through the pipe 5 which leads them to the secondary condenser 6.

The secondary condensate passes through the pipe 7 into the decanting vessel 8 inside which it separates into two layers. One of the two layers is returned through the pipe 9 into the distillation column 1 to serve as a reflux while the other layer is exhausted through the pipe 10. In the case of Fig. 1 the upper layer serves as a reflux. Obviously it is possible to use the two layers in the reverse manner.

The primary condenser 3 is held at its adjusted temperature through the boiling of liquid having the desired boiling temperature and of which a certain amount has been placed once and for all inside a receiver 12 from which it moves inside a closed circuit comprising the pipe 13 leading the liquid to the tubular bundle 3 where it is vaporized after which the vapours produced return into the receiver 12 where they are condensed by means of a condenser which may be of the water circulating type illustrated diagrammatically at 14. The pipe 15 is an equilibrating pipe.

It is possible to use as a cooling liquid a liquid having the same boiling temperature as the eutectic or a temperature lower by a few degrees in order to take into account the drop of temperature required for the operation of the tubular bundle 3.

It is possible without modifying departing from the scope of the invention to modify the pressure either in the cooling circuit or in the cooled circuit so as to modify either the boiling temperature of the eutectic or the boiling temperature of the cooling fluid. In this case, the equilibrating pipe 15 is omitted or isolated.

It should be noticed that nothing prevents the eutectic itself from being used in the cooling circuit. It is sufficient to calculate the size of the apparatus or the amount of circulating fluid in a manner such that the decantation may not have time to be produced and that the liquid may appear under the form of an emulsion.

Obviously if the liquid operated upon were not provided with an eutectic point but only with a transition point it would not be possible to consider the question of decantation in the cooling circuit.

In the case of Fig. 2, the arrangement relates to the case where the temperature of the eutectic mixture is very little different from that of the substance having the lower boiling point. Under such conditions, it is obviously of interest in certain cases to use the latter substance as a cooling fluid, which leads to a simplification of the apparatus compensated it is true by a less accurate adjustment of the separation. The vapours rising in the pipe 5 may have a mean composition slightly different from that of the eutectic.

On the contrary, it is possible to do away with the cooler 14 by leading the vapours from the receiver 12 through the pipe 16 into the secondary condenser 6. Consequently the vapours from the tubular bundle 3 and the body 12 may be without any drawback blended with one another through the connection provided between the pipes 5 and 16. The continuity of the cooling circuit inside the primary condenser is ensured by the pipe 17 which returns in a continuous manner into receiver 12 the layer in the decanting vessel which is constituted by the cooling fluid. The excess of cooling fluid is removed through the pipe 18 so as to keep constant the level of the condensate inside the receiver 12.

In the example illustrated in Fig. 3, there is no modification in the principles underlying the example illustrated in Fig. 2. The example of Fig. 3 has for its interest to show that the execution of the invention is by no means limited to any particular arrangement of the different parts of the apparatus. The vapours rising from the column 1 enter directly into the tubular bundle 3 and from there into a further tubular bundle 6 lying just above the first bundle inside the column 1 itself. The primary condensate is collected at 20 and is exhausted through the pipe 4; the secondary condensate is collected at 21 and passes through the pipe 7 into the decanting vessel 8. The vapours of the cooling fluid rise through the space 22 and mix with the eutectic vapours passing through the bundle 3 into the condenser 6 inside which they are simultaneously condensed through the action of the cooling liquid entering the apparatus at 23 and passing out of same at 24.

The cooling liquid from one of the two layers in the decanting vessel 8 is returned through the pipe 17 into the tubular bundle 3 while the excess of said fluid is as before, exhausted at 18.

Nothing is changed as to the scope of the invention by increasing the size of the plate 21 on which is collected the secondary condensate so that a decantation of hot liquids is produced on said plate. This allows the omission of the decanting vessel 8 which is thus formed in one with the plate 21. In this case the pipe 17 removes one of the two layers which is formed on this deep plate in order to return it to the tubular bundle 3.

What I claim is:

A method of separating a mixture of vapors of liquids that are not normally miscible in the liquid state but form a eutectic mixture, said vapor mixture containing a substantial excess of one component above the amount required to form said eutectic mixture, which comprises condensing a substantial portion of said excess component in a primary condensation zone maintained at a temperature substantially the same as the dew point of said eutectic mixture by vaporizing, in indirect heat relationship with said vapor mixture, a cooling liquid consisting of said eutectic mixture, and passing uncondensed vapors of said vapor mixture as well as vapors of said cooling liquid to a secondary condensation zone, and passing a portion of the eutectic mixture condensed in the secondary condensation zone to the primary condensation zone as cooling liquid.

LOUIS MASSIOT.

REFERENCES CITED

The following references are of record in the file of this patent:

UNITED STATES PATENTS

| Number | Name | Date |
|---|---|---|
| 898,980 | Lowenstein | Sept. 15, 1908 |
| 2,054,096 | Potts et al. | Sept. 15, 1936 |
| 2,290,373 | Lee | July 21, 1942 |
| 2,730,892 | Leslie | Oct. 8, 1951 |

FOREIGN PATENTS

| Number | Country | Date |
|---|---|---|
| 546,414 | Great Britain | July 13, 1942 |

OTHER REFERENCES

Badger and McCabe, Elements of Chemical Engineering, Second Edition, published 1936 by McGraw-Hill Book Company, New York, New York. Pages 368, 373.